Patented Dec. 1, 1931

1,834,363

UNITED STATES PATENT OFFICE

JOHN HILL WATSON AND HUGH EDWARD ANDERSON, OF LINWOOD, SCOTLAND

MANUFACTURE OF PAPER

No Drawing. Application filed August 20, 1930, Serial No. 476,728, and in Great Britain July 25, 1930.

This invention relates to improvements in the manufacture of paper in which is incorporated a layer of india rubber.

According to the invention a layer of rubber in sheet form is interposed or sandwiched between two webs of paper immediately after the paper is made on the wire and before couching, and thereupon the superposed sheets are subjected to pressing and drying operations between heated rolls whereby the rubber is melted by the heat of the rolls and is pressed by the pressure of the rolls into the pores of the paper.

Paper impregnated with rubber or rubber substitute in the manner described is water-proof, grease-proof, acid-proof and alkali-proof and has important insulating properties.

We claim:—

A process of manufacturing paper in which a layer of rubber is pressed between two plies of paper, characterized in that the rubber layer in the form of a rubber sheet is interposed between two webs of paper immediately after the paper is "made" on the wire and before couching and that thereupon the superposed sheets are subjected to pressing and drying between heated rolls whereby the rubber is melted by the heat of the rolls and is pressed by pressure of the rolls into the pores of the paper.

In testimony whereof we have signed our names to this specification.

JOHN HILL WATSON.
HUGH EDWARD ANDERSON.